US008650543B1

(12) United States Patent
Winch

(10) Patent No.: US 8,650,543 B1
(45) Date of Patent: Feb. 11, 2014

(54) SOFTWARE COMPATIBILITY CHECKING

(75) Inventor: Jordan Banes Winch, Dunstable, MA (US)

(73) Assignee: Intuit Inc., Mountain View, CA (US)

(*) Notice: Subject to any disclaimer, the term of this patent is extended or adjusted under 35 U.S.C. 154(b) by 209 days.

(21) Appl. No.: 13/069,761

(22) Filed: Mar. 23, 2011

(51) Int. Cl.
*G06F 9/44* (2006.01)

(52) U.S. Cl.
USPC ............................ 717/124; 717/120; 717/121

(58) Field of Classification Search
None
See application file for complete search history.

(56) References Cited

U.S. PATENT DOCUMENTS

| | | | |
|---|---|---|---|
| 6,052,584 A * | 4/2000 | Harvey et al. ................. | 455/423 |
| 6,256,781 B1 * | 7/2001 | Okajima ........................ | 710/62 |
| 6,836,814 B2 * | 12/2004 | Takaoka et al. ................ | 710/316 |
| 7,805,624 B2 * | 9/2010 | Inai .............................. | 713/310 |
| 7,873,758 B2 * | 1/2011 | Hu et al. ........................ | 710/37 |
| 7,913,263 B2 * | 3/2011 | Wu et al. ....................... | 719/321 |
| 8,140,360 B2 * | 3/2012 | Kwan ............................ | 705/4 |
| 2007/0288936 A1 * | 12/2007 | Wu et al. ....................... | 719/322 |
| 2008/0156178 A1 * | 7/2008 | Georges et al. ................ | 84/645 |
| 2009/0037594 A1 * | 2/2009 | Sever et al. ................... | 709/230 |
| 2009/0125646 A1 * | 5/2009 | Rosenan et al. ............... | 710/15 |
| 2009/0177921 A1 * | 7/2009 | Kuriyama ...................... | 714/16 |
| 2009/0198930 A1 * | 8/2009 | Johnson et al. ............... | 711/162 |
| 2010/0281183 A1 * | 11/2010 | Van Bebber ................... | 710/5 |
| 2011/0047266 A1 * | 2/2011 | Yu et al. ........................ | 709/224 |
| 2011/0081859 A1 * | 4/2011 | Chung .......................... | 455/41.2 |
| 2011/0112968 A1 * | 5/2011 | Florek et al. .................. | 705/50 |
| 2012/0008851 A1 * | 1/2012 | Pennock et al. ............... | 382/140 |
| 2012/0011071 A1 * | 1/2012 | Pennock et al. ............... | 705/75 |
| 2012/0024131 A1 * | 2/2012 | Georges et al. ................ | 84/645 |
| 2012/0095915 A1 * | 4/2012 | McKelvey ...................... | 705/44 |
| 2012/0117467 A1 * | 5/2012 | Maloney et al. ............... | 715/273 |
| 2012/0191612 A1 * | 7/2012 | Spodak et al. ................. | 705/65 |
| 2012/0231838 A1 * | 9/2012 | Lyon et al. .................... | 455/556.1 |
| 2012/0303520 A1 * | 11/2012 | Huang ........................... | 705/39 |
| 2013/0031004 A1 * | 1/2013 | Dorsey et al. ................. | 705/44 |
| 2013/0212521 A1 * | 8/2013 | Fedoseyeva et al. .......... | 715/781 |

FOREIGN PATENT DOCUMENTS

WO    WO 2008/063990    *    5/2008    ............ G06Q 20/00

OTHER PUBLICATIONS

Authors: Leonid Ryzhyk, Pete rChub, Ihor Kuz, Etienne LeSueur, Gernot Heiser Title: AutomaticDeviceDriverSynthesiswithTermite ACM 2009: SOSP '09 Proceedings of the ACM SIGOPS 22nd symposium on Operating systems principles pp. 73-86.*

"Automatic Device Driver Synthesis with Termite" by Leonid Ryzhyk † Peter Chubb † Ihor Kuz † Etienne Le Sueur † Gernot Heiser. Published by ACM 2009 Article.*

* cited by examiner

*Primary Examiner* — Isaac Tecklu
*Assistant Examiner* — Hossain Morshed
(74) *Attorney, Agent, or Firm* — Park, Vaughan, Fleming & Dowler LLP; Steven E. Stupp

(57) ABSTRACT

During a compatibility testing technique, a portable electronic device launches a test version of a module in the application prior to executing the application in an environment on the portable electronic device. This module may be associated with the external electronic device (such as an audio jack swiper), and launching the test version of the module may involve providing configuration information associated with operation of the module to the environment. If, in response to the configuration information, the test version is initialized correctly by the environment, the portable electronic device subsequently executes the application with the module. Alternatively, if, in response to the configuration information, the test version is not initialized correctly by the environment, the portable electronic device subsequently executes the application without the module.

19 Claims, 4 Drawing Sheets

SOFTWARE COMPATIBILITY CHECKING

BACKGROUND

The present disclosure relates to techniques for testing the compatibility of a software application with an operating system, thereby preventing execution failure of the application.

The increasing popularity of so-called smartphones has resulted in an enormous increase in the number of available software applications for these devices. In particular, by sharing a common operating system, such as the Android™ mobile operating system (from Google, Inc., of Mountain View, Calif.), smartphones from different cellular service providers can in principle execute a common version of a software application. In practice, this can be challenging, because of differences in the configurations of different smartphones and their capabilities.

For example, remote-payment applications allow users of smartphones to conduct financial transactions. In order to so, the users often have to provide payment information, such as credit-card or debit-card information. One way to provide this information is via a so-called 'audio jack swiper.' An audio jack swiper is an electronic device that can be electrically coupled to a smartphone via a 3.5 mm connector (which is commonly referred to as a 'headphone jack'). Once the audio jack swiper is coupled to a smartphone, a compatible remote-payment application that executes on the smartphone can initiate two-way communication with the audio jack swiper. This allows a merchant who is also using the portable-payment application to receive the customer's credit- or debit-card information when they swipe their credit or debit card through the audio jack swiper. Then, the merchant relays this information to a financial institution (or an affiliated third party) to complete a financial transaction.

However, it has proven difficult to support the audio jack swiper with remote-payment applications on smartphones that use the Android mobile operating system, because the behavior of the audio jack swiper is often inconsistent on the more than fifty existing smartphones that presently use this operating system. In particular, on many smartphones attempts to use the audio jack swiper often result in a long initialization period (15-60 seconds) followed by a failure of a portable payment application to start. In some cases, the portable payment application crashes when attempting to communicate with the audio jack swiper. This wide range of unpredictable behaviors is frustrating to users and degrades the user experience.

SUMMARY

The disclosed embodiments relate to a portable electronic device that executes an application. During operation, the portable electronic device detects electrical coupling between the portable electronic device and an external electronic device. Then, the portable electronic device launches a test version of a module in the application that executes in an environment on the portable electronic device. This module may be associated with the external electronic device, and launching the test version of the module may involve providing configuration information associated with operation of the module to the environment. If, in response to the configuration information, the test version is initialized correctly by the environment, the portable electronic device executes the application with the module. Alternatively, if, in response to the configuration information, the test version is not initialized correctly by the environment, the portable electronic device executes the application without the module.

In some embodiments, prior to detecting the electrical coupling, the portable electronic device receives a command to launch the application. For example, the command may be associated with a user-interface operation performed by a user of the portable electronic device (such as when the user clicks on or touches an icon in the user interface).

Note that the environment may include an operating system.

Moreover, the module may facilitate communication between the application and the external electronic device. Furthermore, the external electronic device may include a payment-card swiper, and the electrical coupling may be via an audio port in the portable electronic device. Additionally, the configuration information may include audio-recording specifications.

In some embodiments, the application includes a remote-payment application that facilitates conducting a financial transaction via the portable electronic device. Furthermore, the application may include drivers for the external electronic device.

In some embodiments, the test version catches exceptions when interacting with the environment, thereby preventing execution failure of the application.

Another embodiment provides a method that includes at least some of the operations performed by the portable electronic device.

Another embodiment provides a computer-program product for use with the portable electronic device. This computer-program product includes instructions for at least some of the operations performed by the portable electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a portable electronic device (such as a smartphone), a technique for executing an application on the portable electronic device, and a computer-program product (e.g., software) for use with the portable electronic device are described. During this compatibility testing technique, the portable electronic device launches a test version of a module in the application prior to executing the application in an environment on the portable electronic device. This module may be associated with the external electronic device (such as an audio jack swiper), and launching the test version of the module may involve providing configuration information associated with operation of the module to the environment. If, in response to the configuration information, the test version is initialized correctly by the environment, the portable electronic device subsequently executes the application with the module. Alternatively, if, in response to the configuration information, the test version is not initialized correctly by the environment, the portable electronic device subsequently executes the application without the module.

In this way, the compatibility testing technique may facilitate an improved user experience (e.g., a graceful failure of the module) when using certain hardware (such as the external electronic device) in conjunction with the application. In particular, a user of the portable electronic device may be promptly alerted to a compatibility problem (e.g., within 1 second) in a recoverable way (e.g., the user can keep using other unaffected parts of the application), as opposed to waiting 15-60 seconds to get a more generic error or, worse, a crash. Consequently, the compatibility testing technique may improve the user experience and customer satisfaction with the application and the portable electronic device, with a commensurate impact on sales and customer retention.

In the discussion that follows, the user may include one of a variety of entities, such as: an individual (for example, an existing customer, a new customer, a service provider, a vendor, a contractor, etc.), an organization, a business and/or a government agency. Furthermore, a 'business' (such as the 'entity' described below) should be understood to include: for-profit corporations, non-profit corporations, organizations, groups of individuals, sole proprietorships, government agencies, partnerships, etc.

Figure 1:
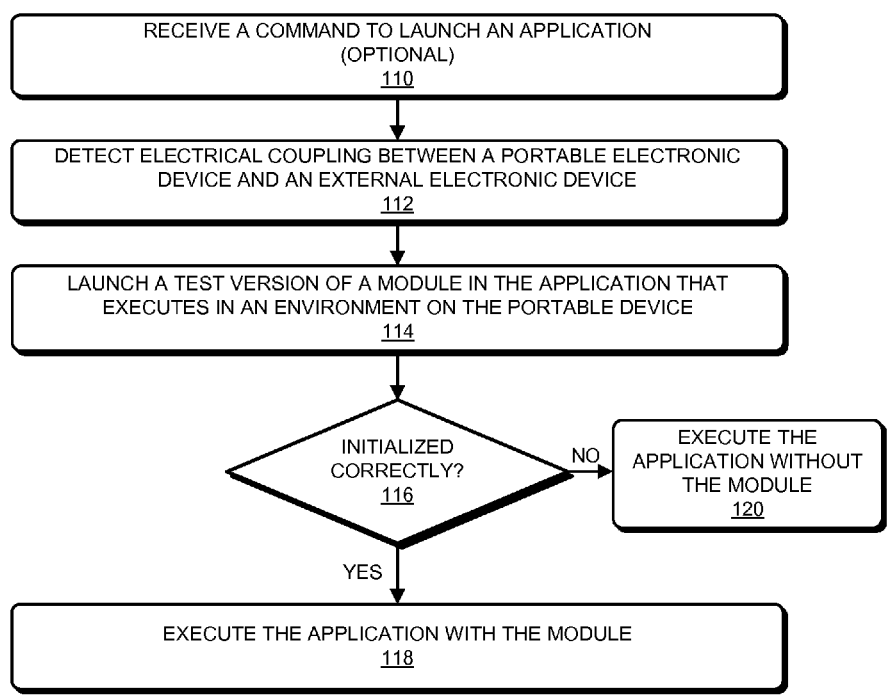
FIG. 1 is a flow chart illustrating a method for executing an application on a portable electronic device in accordance with an embodiment of the present disclosure.

We now describe embodiments of the testing technique. FIG. 1 presents a flow chart illustrating a method 100 for executing an application on a portable electronic device (such as portable electronic device 210 in FIG. 2 and/or 300 in FIG. 3). During operation, the portable electronic device detects electrical coupling between the portable electronic device and an external electronic device (operation 112). Then, the portable electronic device launches a test version of a module in the application that executes in an environment on the portable electronic device (operation 114). This module may be associated with the external electronic device, and launching the test version of the module may involve providing configuration information associated with operation of the module to the environment. If, in response to the configuration information, the test version is initialized correctly by the environment (operation 116), the portable electronic device executes the application with the module (operation 118). Alternatively, if, in response to the configuration information, the test version is not initialized correctly by the environment (operation 116), the portable electronic device executes the application without the module (operation 120).

In some embodiments, prior to detecting the electrical coupling, the portable electronic device receives a command to launch the application (operation 110). For example, the command may be associated with a user-interface operation performed by a user of the portable electronic device (such as when the user clicks on or touches an icon in the user interface).

Note that the environment may include an operating system.

Moreover, the module may facilitate communication between the application and the external electronic device. Furthermore, the external electronic device may include a payment-card swiper, and the electrical coupling may be via an audio port in the portable electronic device. Additionally, the configuration information may include audio-recording specifications.

In some embodiments, the application includes a remote-payment application that facilitates conducting a financial transaction via the portable electronic device. Furthermore, the application may include drivers for the external electronic device.

In some embodiments, the test version catches exceptions when interacting with the environment, thereby preventing execution failure of the application.

In some embodiments of method 100 there may be additional or fewer operations. Moreover, the order of the operations may be changed, and/or two or more operations may be combined into a single operation.

Figure 2:
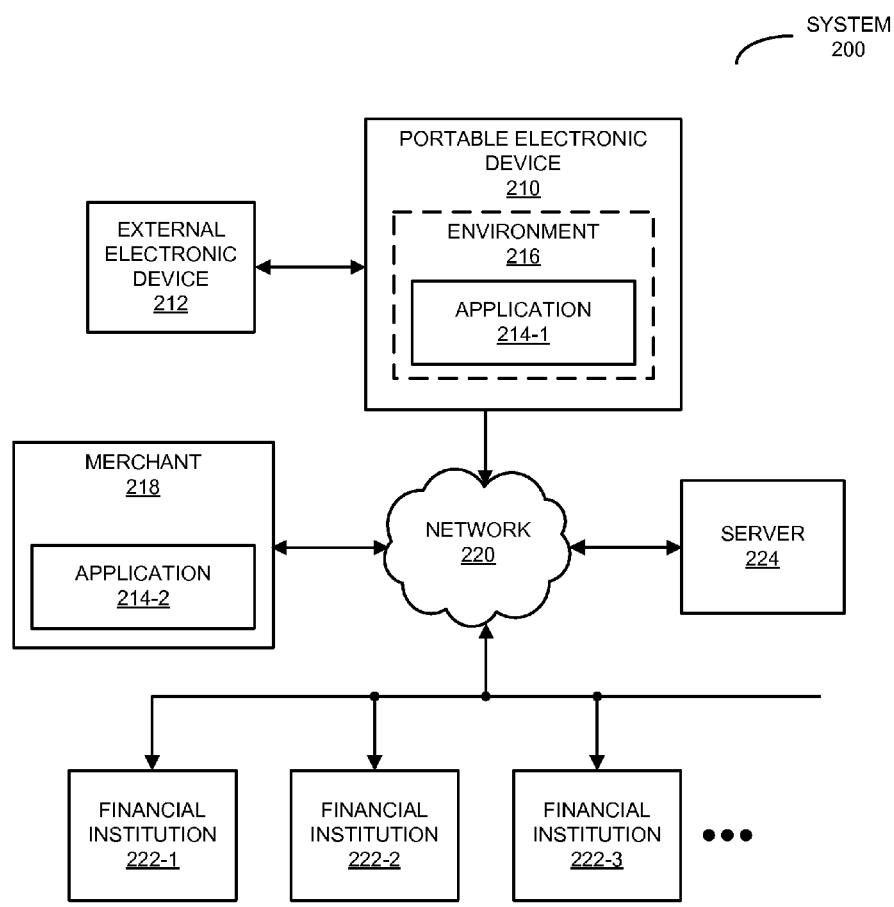
FIG. 2 is a block diagram illustrating a system in accordance with an embodiment of the present disclosure.

We now describe embodiments of a system that includes the portable electronic device. FIG. 2 presents a block diagram illustrating system 200. In this system, portable electronic device 210 can be electrically coupled to an external electronic device 212. When a user provides payment information to external electronic device 212 (for example, when the user swipes a credit or debit card through external electronic device 212), it is communicated to application 214-1. This application may provide the payment information to a merchant 218, who is running a compatible instance of the same application (e.g., application 214-2), via network 220 (such as a cellular telephone network and/or the Internet). Then, the merchant (via application 214-2) may provide the payment information to one of financial institutions 222 (such as financial institution 222-1) using network 220 (such as the Internet), so that financial institution 222-1 can approve the financial transaction.

Note that application 214-1 may be resident on and may execute in an environment 216 on portable electronic device 210. Moreover, application 214-1 may be a standalone application or a portion of another application that is resident on and which executes on portable electronic device 210 (such as financial software that is provided by server 224, or that is installed and which executes on portable electronic device 210).

In some embodiments, at least a portion of application 214-1 may be an application tool (such as a financial software application tool) that is embedded in the web page (and which executes in a virtual environment of a web browser on portable electronic device 210). Thus, the financial software application tool may be provided to the user via a client-server architecture.

In an exemplary embodiment, external electronic device 212 is an audio jack swiper, portable electronic device 210 is a cellular telephone (such as a smartphone), application 214-1 is a remote-payment application (such as GoPayment from Intuit, Inc., of Mountain View, Calif.), and environment 216 is the Android mobile operating system. As noted previously, in some smartphones the audio jack swiper does not operate correctly. This problem occurs because of variations in the implementation of audio recording and media playback in the smartphones produced by different manufacturers.

Moreover, the filtering in the Android mobile operating system is typically only granular enough to restrict the use of the GoPayment application on cellular telephones based on the operating-system version or the screen size. As a consequence, it has proven difficult to 'lock out' specific cellular telephones from downloading the entire GoPayment application (including an audio jack swiper module), which can result in improper operation or crashes of the GoPayment application.

To avoid this problem, a small 'compatibility check' that simulates the functionality needed to correctly initialize and run the audio jack swiper can be performed. This compatibility check may ensure that: the GoPayment application has permission to record audio; the cellular telephone supports audio recording; and/or the cellular telephone can record at the correct frequency and sampling rate. Moreover, the compatibility check may be performed in a conservative way, for example, by looking for or expecting a failure and, if a failure occurs, ensuring that no damage occurs. Note that the compatibility check may be performed quickly (such as in less than a second), which can allow communication with the audio jack swiper to be avoided (thereby eliminating the nondeterministic behavior that can occur when communicating with incompatible hardware). Thus, the compatibility check can occur in far less time than the 15-60 seconds that communication with the audio jack swiper often entails.

While additional checks in a sequence of checks can be subsequently performed, the compatibility check may occur first because it is fast and can catch 'permanent' problems (such as hardware incompatibility). Moreover, by detecting such incompatibility early, possible crashes as a result of communication attempts with the audio jack swiper can be avoided. In some embodiments, the compatibility check is implemented in a generic manner, so that it can be used on new cellular telephones without requiring an update of the compatibility check.

Thus, when a user first attempts to enable the audio jack swiper, the compatibility check may be performed. For example, the user may launch the GoPayment application, and then the user may plug in the audio jack swiper. (Note that the drivers for the audio jack swiper may be included in: the GoPayment application, the Android mobile operating system and/or the cellular telephone.) Because many cellular telephones do not support the audio recording needed for the audio jack swiper (such as 44 kb/s and 16 bit resolution), the compatibility check may be 'pre-launched' to prevent software crashes.

In particular, the compatibility check may create and initialize a completely isolated audio record object. This audio record object may function as a 'canary in the coal mine,' thereby forewarning against problems. Note that the compatibility check may use a small fraction of the kilobytes of memory used by the full audio jack swiper module (which may be included in the GoPayment application), so the compatibility check may execute quickly and may not result in any noticeable lag to the user.

During execution, the compatibility check may provide configuration information for the GoPayment application to the Android operating system. For example, the configuration information may include audio-recording configuration information (such as a resolution or a data rate). Moreover, the configuration information may be associated with the brand or model of audio jack swiper being used and/or the cellular telephone.

Moreover, the compatibility check may be written defensively so that it catches exceptions and stops execution of the audio jack swiper module so that the GoPayment application does not crash. Thus, after the compatibility check, the compatibility check software may check the state of the 'canary' object. If it is incorrectly initialized or not initialized at all (e.g., if the canary is dead), the audio jack swiper is considered incompatible. In this case, the Android mobile operating system may be informed and the GoPayment application may be instructed to shut down the audio jack swiper module. Then, the rest of the GoPayment application can be used safely.

Figure 3:
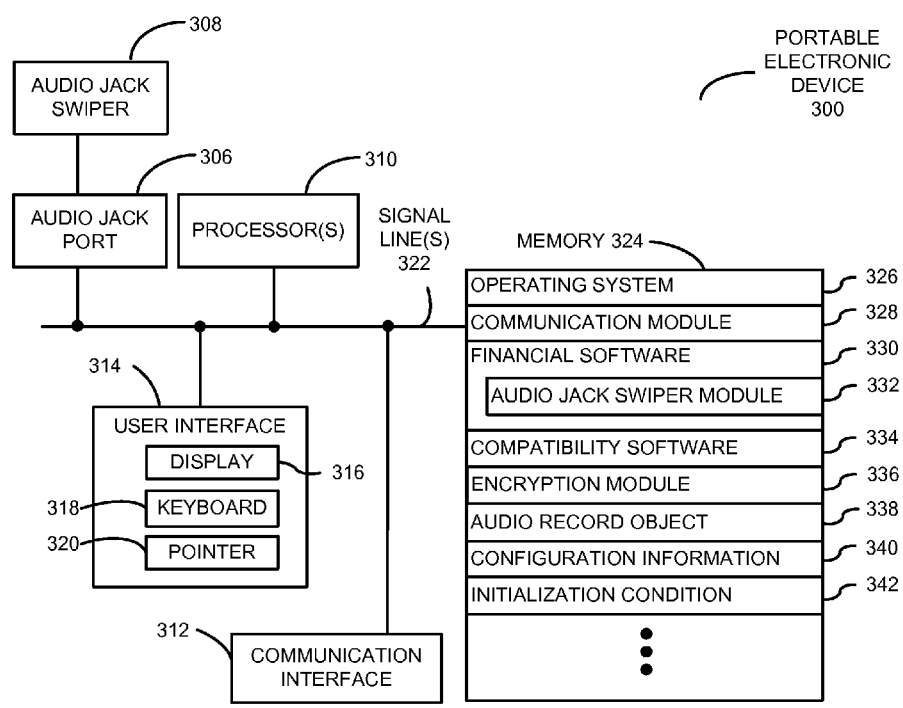
FIG. 3 is a block diagram illustrating a portable electronic device that performs the method of FIG. 1 in accordance with an embodiment of the present disclosure.

We now describe embodiments of the portable electronic device and its use. FIG. 3 presents a block diagram illustrating a portable electronic device 300 that performs method 100 (FIG. 1), such as portable electronic device 210 in FIG. 2 (which may be a computer system, such as a so-called smartphone). Portable electronic device 300 includes one or more processing units or processors 310, a communication interface 312, a user interface 314, and one or more signal lines 322 coupling these components together. Note that the one or more processors 310 may support parallel processing and/or multi-threaded operation, the communication interface 312 may have a persistent communication connection, and the one or more signal lines 322 may constitute a communication bus. Moreover, the user interface 314 may include: a display 316, a keyboard 318, and/or a pointer 320, such as a mouse.

Memory 324 in portable electronic device 300 may include volatile memory and/or non-volatile memory. More specifically, memory 324 may include: ROM, RAM, EPROM, EEPROM, flash memory, one or more smart cards, one or more magnetic disc storage devices, and/or one or more optical storage devices. Memory 324 may store an operating system 326 that includes procedures (or a set of instructions) for handling various basic system services for performing hardware-dependent tasks. Memory 324 may also store procedures (or a set of instructions) in a communication module 328. These communication procedures may be used for communicating with one or more computers and/or servers, including computers and/or servers that are remotely located with respect to portable electronic device 300.

Memory 324 may also include multiple program modules (or sets of instructions), including: financial software 330 (or a set of instructions), compatibility software 334 (or a set of instructions), and/or encryption module 336 (or a set of instructions). Moreover, financial software 330 may include audio jack swiper module 332 (or a set of instructions), which may facilitate communication with audio jack swiper 308. Note that one or more of these program modules (or sets of instructions) may constitute a computer-program mechanism.

During method 100 (FIG. 1), a user of portable electronic device 300 may launch financial software 330 (such as GoPayment). Then, portable electronic device 300 and/or compatibility software 334 may detect electrical coupling to audio jack swiper 308 (for example, via audio port 306).

Figure 4:
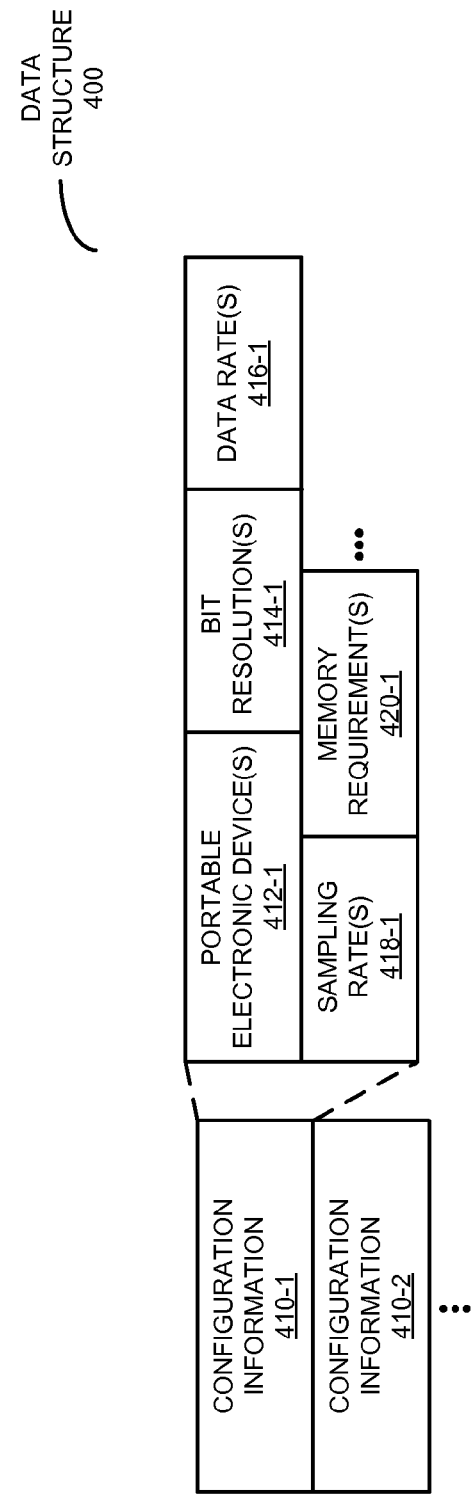
FIG. 4 is a block diagram illustrating a data structure for use in the portable electronic device of FIG. 3 in accordance with an embodiment of the present disclosure.

In response, compatibility software 334 may launch audio record object 338 that executes in operating system 326. This audio record object 338 may provide configuration information 340 associated with operation of audio jack swiper module 332 to operating system 326. Configuration information 340 may be stored in a data structure, such as data structure 400 in FIG. 4. In particular, data structure 400 may include configuration information 410 for one or more portable electronic device(s) 412, including audio-recording specifications, such as: one or more bit resolution(s) 414, one or more data rate(s) 416, one or more sampling rate(s) 418 and/or one or more memory requirement(s) 420 associated with audio jack swiper module 332 (FIG. 3).

Referring back to FIG. 3, after audio record object 338 has executed, compatibility software 334 may determine an initialization condition 342. If initialization condition 342 indicates that audio record object 338 was correctly initialized by operating system 326, financial software 330 may execute, including communication with audio jack swiper 308 via audio jack swiper module 332. Alternatively, if initialization condition 342 indicates that audio record object 338 was not correctly initialized by operating system 326, financial software 330 may execute without audio jack swiper module 332 (i.e., communication with audio jack swiper 308 may be disabled). Thus, audio record object 338 may catch or identify exceptions when interacting with the operating system 326, thereby preventing execution failure of financial software 330.

As noted previously, financial software 330 may include a remote-payment application that facilitates conducting a financial transaction via portable electronic device 300. In exemplary embodiments, financial software 330 includes: GoPayment, Quicken™ and/or TurboTax™ (from Intuit, Inc., of Mountain View, Calif.), Microsoft Money™ (from Microsoft Corporation, of Redmond, Wash.), Splash-Money™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, financial software 330 may include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), Tally.ERP (from Tally Solutions, Ltd., of Bangalore, India) and/or other payroll or accounting software capable of processing payroll information.

Furthermore, because the information in memory 324 may be sensitive in nature, in some embodiments at least some of the data stored in memory 324 and/or at least some of the data communicated using communication module 328 is encrypted using encryption module 336. Additionally, in some embodiments one or more of the modules in memory 324 may be included in financial software 330.

Instructions in the various modules in memory 324 may be implemented in: a high-level procedural language, an object-oriented programming language, and/or in an assembly or machine language. Note that the programming language may be compiled or interpreted, e.g., configurable or configured, to be executed by the one or more processors 310.

Although portable electronic device 300 is illustrated as having a number of discrete items, FIG. 3 is intended to be a functional description of the various features that may be present in portable electronic device 300 rather than a structural schematic of the embodiments described herein. In practice, and as recognized by those of ordinary skill in the art, the functions of portable electronic device 300 may be distributed over a large number of servers, computers or electronic devices, with various groups of the servers or computers performing particular subsets of the functions. In some embodiments, some or all of the functionality of portable electronic device 300 may be implemented in one or more application-specific integrated circuits (ASICs) and/or one or more digital signal processors (DSPs).

Portable electronic devices 210 (FIG. 2) and/or 300 may include one of a variety of devices capable of manipulating computer-readable data or communicating such data between two or more computing systems over a network, including: a personal computer, a laptop computer, a tablet computer, a cellular phone, a personal digital assistant, a server and/or a client computer (in a client-server architecture). Moreover, communication with these portable electronic devices may occur over a network, such as: the Internet, World Wide Web (WWW), an intranet, LAN, WAN, MAN, or a combination of networks, or other technology enabling communication between computing systems.

Portable electronic device 210 (FIG. 2), portable electronic device 300 and/or data structure 400 may include fewer components or additional components. For example, drivers (not shown) for audio jack swiper 308 may be included in hardware in portable electronic device 300 or software, such as operating system 326 and/or financial software 330. In some embodiments, compatibility software 334 is included in operating system 326, financial software 330 and/or as a standalone application. Moreover, two or more components may be combined into a single component, and/or a position of one or more components may be changed. Note that the functionality of portable electronic devices 210 (FIG. 2) and/or 300 may be implemented more in hardware and less in software, or less in hardware and more in software, as is known in the art.

While an audio jack swiper, a cellular telephone, a remote-payment application and the Android mobile operating system have been used as illustrations in the preceding discussion, in other embodiments the compatibility testing technique may be used in conjunction with a wide variety of electronic devices, applications and environments (including embedded and real-time operating systems).

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for executing an application on a portable electronic device, comprising:
    detecting electrical coupling between the portable electronic device and an external electronic device, wherein the external electronic device is an audio jack swiper;
    launching, a test version of a module in the application that executes in an environment on the portable electronic device, wherein the test version simulates functionality that is needed to correctly initialize and run the audio jack swiper, wherein the test version checks at least if the application has permission to record audio, if the portable electronic device supports audio recording, and if the portable electronic device records at a correct frequency and sampling rate, wherein the module is associated with the external electronic device, and wherein launching the test version of the module involves providing configuration information associated with operation of the module to the environment, wherein the configuration information provided involves audio recording parameters required by the application;
    if, in response to the configuration information, the test version is initialized correctly by the environment, executing the application with the module; and if, in response to the configuration information, the test version is not initialized correctly by the environment, executing the application in the portable electronic device without the module.

2. The method of claim 1, wherein, prior to detecting the electrical coupling, the method further comprises receiving a command to launch the application on the portable electronic device.

3. The method of claim 2, wherein the command is associated with a user-interface operation performed by a user of the portable electronic device.

4. The method of claim 1, wherein the module facilitates communication between the application and the external electronic device.

5. The method of claim 1, wherein the external electronic device includes a payment-card swiper; and
wherein the electrical coupling is via an audio port in the portable electronic device.

6. The method of claim 1, wherein the application includes a remote-payment application that facilitates conducting a financial transaction via the portable electronic device.

7. The method of claim 1, wherein the application includes drivers for the external electronic device.

8. The method of claim 1, wherein the test version catches exceptions when interacting with the environment, wherein handling of the exceptions involve stopping execution of the module and disabling communication with the external electronic device, thereby preventing execution failure of the application.

9. The method of claim 1, wherein the checks performed by the test version is completed in a time that is less than a time taken for communication with the audio jack swiper.

10. The method of claim 1, wherein the checks performed by the test version use less memory than that needed by a full version of the audio jack swiper module.

11. A non-transitory computer-program product for use in conjunction with a portable electronic device, the computer-program product comprising a computer-readable storage medium and a computer-program mechanism embedded therein to executing an application on a portable electronic device, the computer-program mechanism including:
instructions for detecting electrical coupling between the portable electronic device and an external electronic device, wherein the external electronic device is an audio jack swiper;
instructions for launching a test version of a module in the application that executes in an environment on the portable electronic device, wherein the test version simulates functionality that is needed to correctly initialize and run the audio jack swiper, wherein the test version checks at least if the application has permission to record audio, if the portable electronic device supports audio recording, and if the portable electronic device records at a correct frequency and sampling rate, wherein the module is associated with the external electronic device, and wherein launching the test version of the module involves providing configuration information associated with operation of the module to the environment, wherein the configuration information provided involves audio recording parameters required by the application;
if, in response to the configuration information, the test version is initialized correctly by the environment, instructions for executing the application with the module; and
if, in response to the configuration information, the test version is not initialized correctly by the environment, instructions for executing the application in the portable electronic device without the module.

12. The computer-program product of claim 11, wherein, prior to detecting the electrical coupling, the computer-program mechanism further comprises instructions for receiving a command to launch the application on the portable electronic device.

13. The computer-program product of claim 12, wherein the command is associated with a user-interface operation performed by a user of the portable electronic device.

14. The computer-program product of claim 11, wherein the module facilitates communication between the application and the external electronic device.

15. The computer-program product of claim 11, wherein the external electronic device includes a payment-card swiper; and
wherein the electrical coupling is via an audio port in the portable electronic device.

16. The computer-program product of claim 11, wherein the application includes a remote-payment application that facilitates conducting a financial transaction via the portable electronic device.

17. The computer-program product of claim 11, wherein the application includes drivers for the external electronic device.

18. The computer-program product of claim 11, wherein the test version catches exceptions when interacting with the environment, wherein handling of the exceptions involve stopping execution of the module and disabling communication with the external electronic device, thereby preventing execution failure of the application.

19. A portable electronic device, comprising:
a processor;
memory; and
a program module, wherein the program module is stored in the memory and configurable to be executed by the processor to execute an application on a portable electronic device, the program module including:
instructions for detecting electrical coupling between the portable electronic device and an external electronic device, wherein the external electronic device is an audio jack swiper;
instructions for launching a test version of a module in an application that executes in an environment on the portable electronic device, wherein the test version simulates functionality that is needed to correctly initialize and run the audio jack swiper, wherein the test version checks at least if the application has permission to record audio, if the portable electronic device supports audio recording, and if the portable electronic device records at a correct frequency and sampling rate, wherein the module is associated with the external electronic device, and wherein launching the test version of the module involves providing configuration information associated with operation of the module to the environment, wherein the configuration information provided involves audio recording parameters required by the application;
if, in response to the configuration information, the test version is initialized correctly by the environment, instructions for executing the application with the module; and
if, in response to the configuration information, the test version is not initialized correctly by the environment, instructions for executing the application in the portable electronic device without the module.

\* \* \* \* \*

UNITED STATES PATENT AND TRADEMARK OFFICE
CERTIFICATE OF CORRECTION

| | | |
|---|---|---|
| PATENT NO. | : 8,650,543 B1 | Page 1 of 1 |
| APPLICATION NO. | : 13/069761 | |
| DATED | : February 11, 2014 | |
| INVENTOR(S) | : Jordan Barnes Winch et al. | |

It is certified that error appears in the above-identified patent and that said Letters Patent is hereby corrected as shown below:

On the Title Page, Item (75), the first named inventor should read: "Jordan Barnes Winch".

Signed and Sealed this
Twentieth Day of May, 2014

Michelle K. Lee
*Deputy Director of the United States Patent and Trademark Office*